April 20, 1943.   A. R. THOMAS   2,317,234
REFRIGERATION
Filed Aug. 3, 1940   3 Sheets-Sheet 1

INVENTOR.
Albert R. Thomas
BY
EA Fernander
his ATTORNEY

April 20, 1943.  A. R. THOMAS  2,317,234
REFRIGERATION
Filed Aug. 3, 1940  3 Sheets-Sheet 2
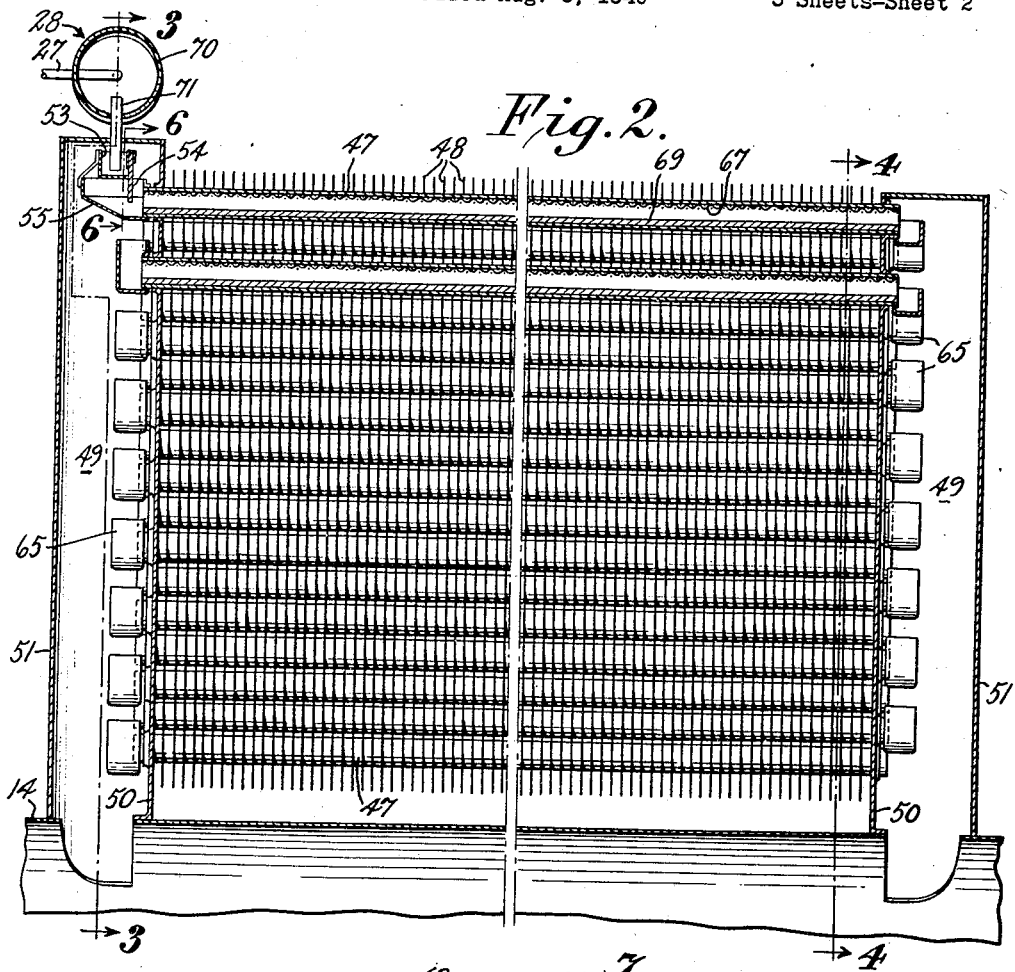
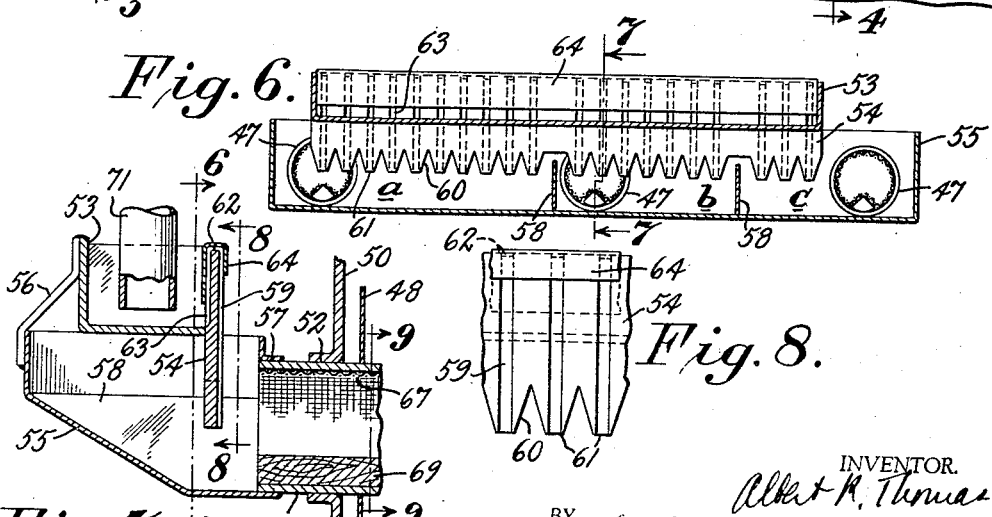
INVENTOR.
Albert R. Thomas
BY
his ATTORNEY April 20, 1943.  A. R. THOMAS  2,317,234
REFRIGERATION
Filed Aug. 3, 1940  3 Sheets-Sheet 3
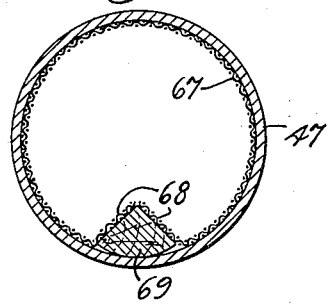
Fig. 5.
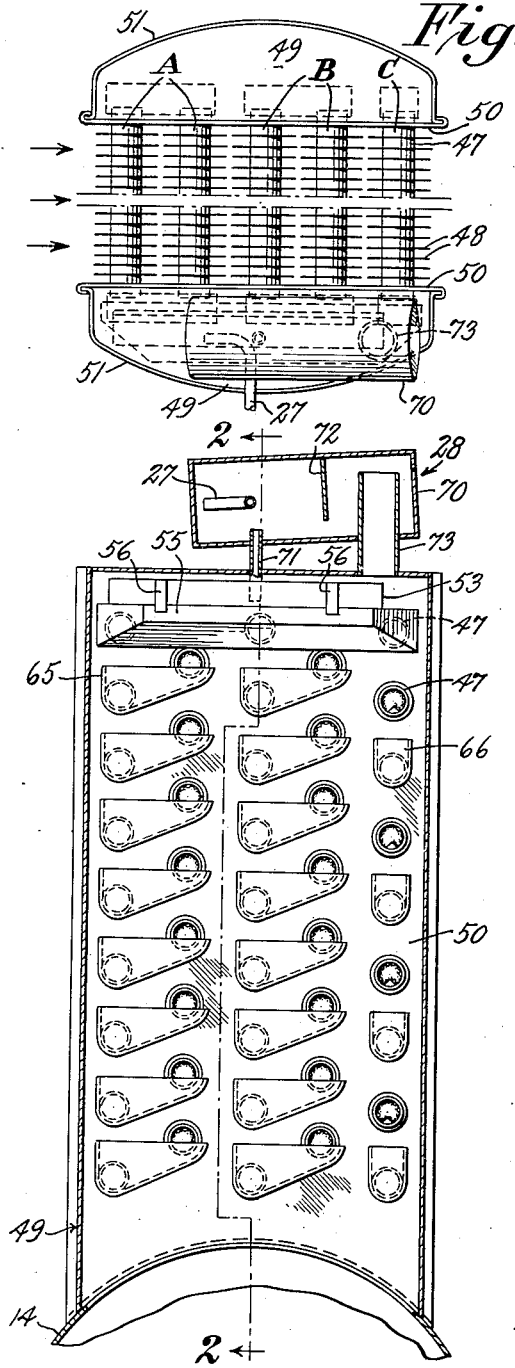
Fig. 3.
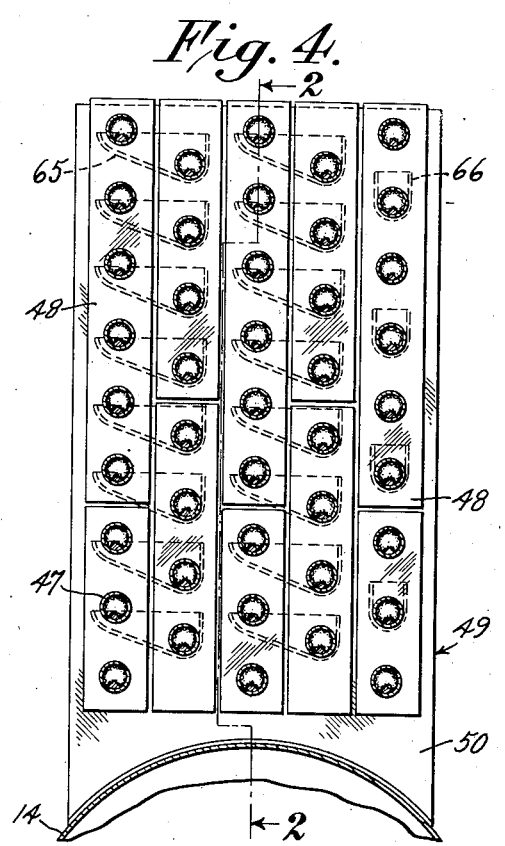
Fig. 9.
Fig. 4.
INVENTOR.
Albert R. Thomas
BY Ell Fernander
his ATTORNEY.

Patented Apr. 20, 1943

2,317,234

UNITED STATES PATENT OFFICE 2,317,234

REFRIGERATION

Albert R. Thomas, Evansville, Ind., assignor to Servel, Inc., New York, N. Y., a corporation of Delaware Application August 3, 1940, Serial No. 350,235

15 Claims. (Cl. 62—119)

This invention relates to refrigeration, and more particularly to refrigeration systems of the absorption type operated by heat.

In a low pressure system of this type containing only a refrigerant and an absorption liquid therefor as the two active fluid components, a generator and condenser operate at one pressure and an evaporator and absorber operate at a lower pressure, and the pressure differential therebetween may be maintained by liquid columns. By way of example, the system may contain a water solution of lithium chloride with water as the refrigerant and lithium chloride solution as the absorption liquid. In order that the system can be operated without moving parts, the absorption liquid is circulated through and between the generator and absorber by gravity with the absorption liquid being raised by gas or vapor-lift action in the generator.

In a low pressure absorption system of the type just described a number of factors must be considered in connection with an evaporator, so that this part will operate efficiently and also will be properly correlated with other parts of the system. One factor to be considered is that of circulating a substantially constant quantity of liquid in the absorption liquid circuit, with variations in the quantity of circulating liquid being kept at a minimum. This is particularly important when gravity flow of absorption liquid is effected by raising of liquid by gas or vapor-lift action, because it is desirable to provide a substantially constant reaction head under all operating conditions, and the quantity of liquid circulating in the absorption liquid circuit determines the height of the reaction head.

It is also desirable to maintain a constant quantity of liquid circulating in the absorption liquid circuit when the refrigeration system contains a salt solution like a water solution of lithium chloride, for example, because a high concentration of absorption solution must be used which is close to the solidifying point. When the quantity of refrigerant out of solution and in parts of the system other than the absorption liquid circuit becomes too great, the concentration of the absorption solution becomes sufficiently high to cause such a quantity of salt to precipitate that the passages in the absorption liquid circuit are closed and blocked.

It is an object of this invention to provide an improved evaporator structure for an absorption refrigeration system of the character described, whereby efficient operation of the system is assured under all operating conditions.

This is accomplished by providing an evaporator structure in which a minimum quantity of liquid refrigerant is retained, so that a substantially constant quantity of absorption solution circulates in the absorption liquid circuit. The evaporator structure includes a plurality of tubes having no barriers to flow of liquid and through which liquid refrigerant merely trickles along the bottom parts thereof. By eliminating all barriers so that pools of liquid cannot form, liquid disturbances in the evaporator, such as superheating, for example, are reduced to a minimum. Further, the evaporator tubing is provided with screening which serves to spread the liquid trickling through the tubes and also functions as a catching film surface for liquid spray. The screens are extremely important in that vaporization of refrigerant takes place therefrom without boiling of liquid and formation of objectionable vapor bubbles.

It is another object of the invention to effect differential feed of liquid refrigerant to different parts of an evaporator with the quantity of liquid supplied to the different parts being proportioned to the heat absorption. When the evaporator is employed to cool a stream of air flowing in thermal exchange relation therewith, liquid refrigerant is accurately subdivided into a plurality of paths of flow and a greater part of liquid is supplied to parts of the evaporator contacted by the warmest air.

The invention, together with the above and other objects and advantages thereof, will be better understood from the following description taken in connection with the accompanying drawings forming a part of this specification, and of which:

Fig. 2 is an enlarged vertical sectional view, taken on lines 2—2 of Figs. 3 and 4, of the evaporator structure shown in Fig. 1;

Fig. 3 is a vertical sectional view, taken on line 3—3 of Fig. 2, to illustrate parts of the evaporator structure more clearly;

Fig. 4 is a vertical sectional view taken on line 4—4 of Fig. 2;

Fig. 5 is a horizontal plan view, partly broken away, of the evaporator structure shown in Figs. 1 to 4 inclusive;

Fig. 6 is an enlarged fragmentary sectional view, taken on lines 6—6 of Figs. 2 and 7, to illustrate more clearly the manner in which liquid is divided in the evaporator structure;

Figure 1:
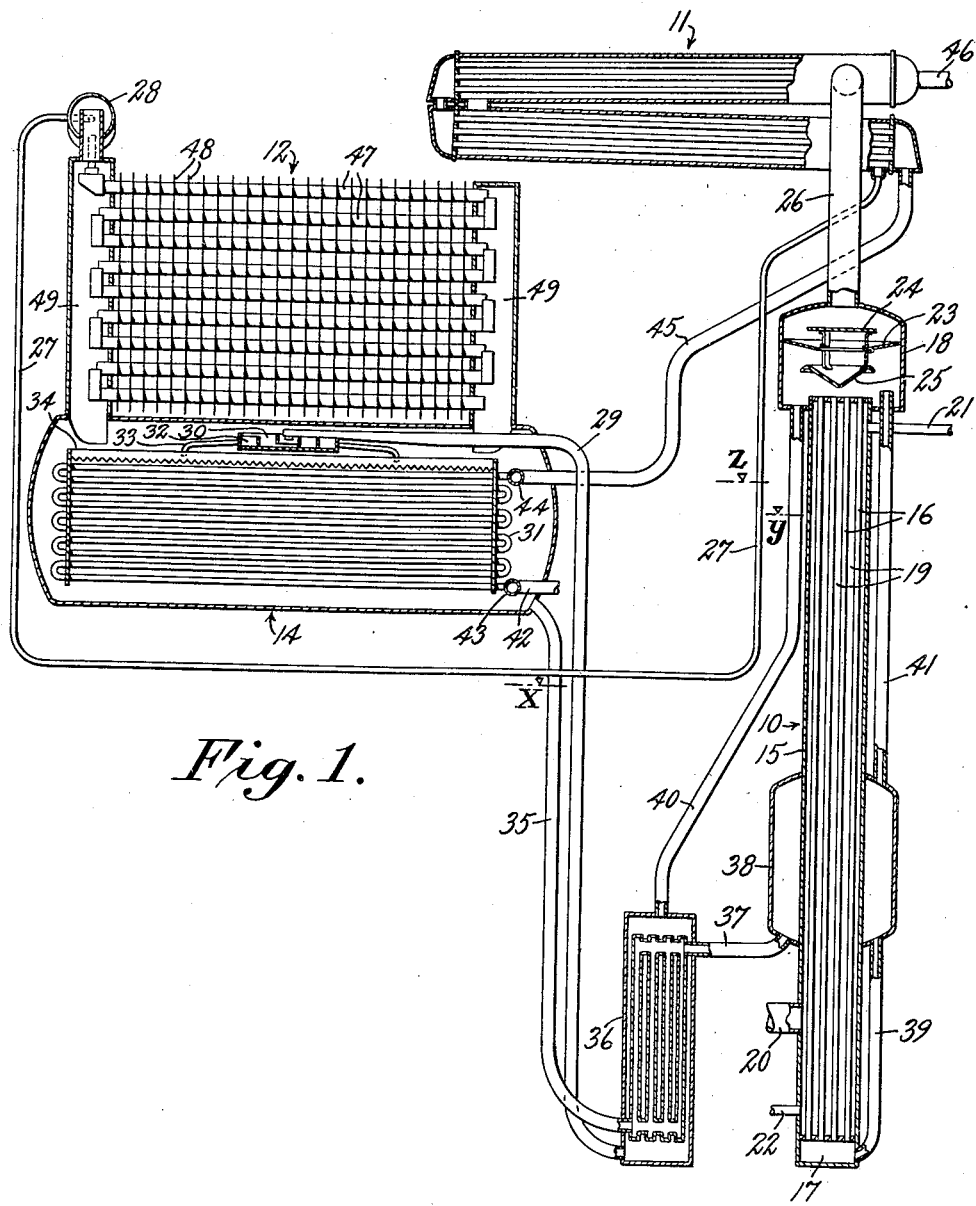
Fig. 1 is a view more or less diagrammatically illustrating an absorption refrigeration system embodying the invention.

Fig. 7 is an enlarged fragmentary sectional view taken on line 7—7 of Fig. 6; and Figs. 8 and 9 are fragmentary sectional views taken on lines 8—8 and 9—9, respectively, of Fig. 7.

Referring to Fig. 1, the present invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator or expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system. Briefly, the generator 10 includes an outer shell 15 within which are disposed a plurality of vertical riser tubes 16 having the lower ends thereof communicating with a space 17, and the upper ends thereof extending into a vessel 18. The space 19 within shell 15 and about the tubes 16 forms a steam chamber to which steam is supplied through a conduit 20. The space 19 provides for full length heating of riser tubes 16, and a vent 21 is provided at the upper end of shell 15. A trap conduit 22 is connected to the lower end of shell 15 above space 17 to provide a drain for condensate formed in space 19.

The system operates at a partial vacuum and contains a water solution of refrigerant in absorption liquid, such as, for example, a water solution of 40% lithium chloride by weight. With steam being supplied through conduit 20 to space 19 at atmospheric pressure, heat is applied to tubes 16 whereby water vapor is expelled from solution. The absorption solution is raised by gas or vapor-lift action with the expelled water vapor forming a central core within an upwardly rising annulus of liquid. The expelled water vapor rises more rapidly than the solution and the liquid follows the inside walls of the tubes 16.

The water vapor flows upwardly through the tubes or risers 16 into vessel 18 which is provided with an apertured baffle 23, and deflectors 24 and 25 at each side of the aperture in the baffle. The baffle 23 and deflectors 24 and 25 serve as a vapor separator, so that expelled water vapor is separated from raised absorption solution in vessel 18 and flows through conduit 26 into condenser 11. The condensate formed in condenser 11 flows through a U-tube 27 into a flash chamber 28 and from the latter into evaporator 12.

In evaporator 12 vaporization of liquid takes place to produce a refrigerating or cooling effect with consequent absorption of heat from the surroundings, as will be described more fully hereinafter. Refrigerant vapor formed in evaporator 12 passes into absorber 14 in which the vapor is absorbed into concentrated absorption liquid entering through a conduit 29. The absorption liquid flows from the upper end of conduit 29 into a liquid receptacle and distributor 30 in which liquid is distributed laterally of a plurality of vertically disposed pipe banks 31 which are arranged alongside each other. The liquid in the center compartment of receptacle 30 is subdivided and passes into a plurality of smaller end compartments 32. Liquid flows from the end compartments 32 through conduits 33 into a plurality of liquid holders and distributors 34 which extend lengthwise of and above the uppermost horizontal pipe sections of pipe banks 31. Absorption liquid siphons over the side walls of the liquid holders 34 with drops of liquid falling onto and completely wetting the uppermost pipe sections. Liquid drips from each horizontal pipe section onto the next lower pipe section, whereby all of the pipe sections in absorber 14 are wetted with a film of liquid.

The water vapor absorbed by the absorption liquid dilutes the latter, and the diluted absorption liquid flows through a conduit 35, a first passage in a liquid heat exchanger 36, a conduit 37, vessel 38, and a conduit 39 into the lower space 17 of generator 10. Water vapor is expelled out of solution in generator 10 by heating, and the solution is raised by gas or vapor-lift action in riser tubes 16, as explained above. The absorption liquid in vessel 18 is concentrated since water vapor has been expelled therefrom in generator 10. This concentrated absorption liquid flows through a conduit 40, a second passage in liquid heat exchanger 36, and conduit 29 into the upper part of absorber 14.

The vessel 38 is cylindrical in shape and disposed about shell 15 of generator 10. The heating effect of the steam in space 19 is transmitted through a portion of shell 15 to absorption liquid in vessel 38, whereby the absorption liquid flowing to the generator through conduit 39 is preheated, as described more fully in Thomas application Ser. No. 347,631, filed July 26, 1940. The upper part of vessel 38 is connected by a conduit 41 to vessel 18, so that the pressure in vessel 38 is equalized with the pressure in the upper end of generator 10 and condenser 11.

The heat liberated with absorption of water vapor in absorber 14 is transferred to a cooling medium, such as water, for example, which flows upward through the vertically disposed pipe banks 31. The cooling medium is supplied through a conduit 42 to a horizontal manifold 43 to which the lower ends of the pipe banks 31 are connected. The upper ends of the pipe banks 31 are connected to a second horizontal manifold 44 to which is connected a conduit 45 through which cooling medium leaves the absorber 14. The conduit 45 is connected to condenser 11, so that same cooling medium may be utilized to cool absorber 14 and condenser 11, with the cooling medium flowing from condenser 11 through conduit 46 to waste.

The system operates at low pressures with the generator 10 and condenser 11 operating at one pressure and the evaporator 12 and absorber 14 operating at a lower pressure, the pressure differential therebetween being maintained by liquid columns. Thus, the liquid column formed in tube 27 maintains the pressure differential between condenser 11 and evaporator 12, the liquid column in conduit 35 maintains the pressure differential between the outlet of absorber 14 and generator 10, and the liquid column formed in conduit 29 and connected parts including conduit 40 maintains the pressure differential between the inlet of the absorber and the upper part of generator 10. In operation, the liquid columns may form in conduits 35, 50 and down-leg of tube 27 to the levels $x$, $y$ and $z$, for example. The conduits are of such size that restriction to gas flow is effected without appreciably restricting flow of liquid.

The liquid column formed in vessel 38 and conduit 39 provides the liquid reaction head for raising liquid in riser tubes 16 by vapor-lift action. The vessel 38 is of sufficient volume to hold the liquid differential in the system and is of such cross-sectional area that the liquid level therein does not appreciably vary, so that a substantially constant reaction head is provided for raising liquid in generator 10. The vessel 38 is located below absorber 14 such a distance that, for the greatest pressure differential occurring between absorber 14 and the upper part of generator 10 during operation of the system, the liquid column formed in conduit 35 is below the lower part of absorber 14.

The conduit 40 extends above the upper end of conduit 39 in order that absorption liquid will flow to absorber 14 by gravity and independently of the pressure differential in the system. After the pressure differential in the system has built up and the liquid column in conduit 40 is at the level y, for example, which is below the liquid column in conduit 29 due to the higher pressure in generator 10 than in absorber 14, gravity flow of absorption liquid still takes place from the upper part of conduit 40 into which liquid spills from the vessel 18.

In accordance with this invention, evaporator 12 includes a plurality of horizontal tubes 47 to which are secured a plurality of heat transfer fins 48. At each end of evaporator 12 is a header 49 formed from a flat metal sheet 50 and a second metal sheet 51 which is more or less U-shaped in horizontal section, as best seen in Fig. 5. The ends of tubes 47 pass through openings 52 in sheets 50 and are secured to the latter at the openings, as best seen in Fig. 7.

The liquid flowing to evaporator 12 through U-tube 27 is conducted to a liquid holder and distributor 53 located in the upper part of one of the headers 49. The liquid holder 53 extends across the header between the side arms of metal sheet 51 and is Y-shaped to form a U trough with one of the side walls 54 extending downward below the bottom of the trough. The liquid distributor 53 is supported directly above a liquid vessel 55 by spaced metal strips 56, as shown in Figs. 2, 3 and 7. The vessel 55 is formed with a sloping bottom wall and sloping end walls and is supported at the ends of the three uppermost tubes 47. As shown in Fig. 7, the ends of the uppermost tubes 47 pass into openings 57 in the vessel 55 and are secured to the latter about the openings. The vessel 55 is divided into three compartments a, b and c by wall members 58, with liquid flowing from each compartment into one of the uppermost tubes 47.

In order to divide the liquid in liquid holder and distributor 53, so that a part of the liquid will flow through each of the uppermost tubes 47, an arrangement is provided to effect siphoning of liquid from the U trough into the vessel 55. This is accomplished by forming slots, as by milling, for example, at the side wall 54 of member 53. The outer surface of side wall 54 is formed with vertical slots 59 which extend from the top to the bottom edge of the side wall, as shown in Figs. 6, 7 and 8. The lower edge of side wall 54 is notched at 60 to form spaced teeth 61 to the extreme bottom edges of which the slots 59 extend. The top edge of side wall 54 is also slotted at 62 with these slots being in alignment with slots 59. The inner surface of side wall 54 is also formed with slots 63 which extend downward from the top cross slots 62 for a distance substantially equal to the depth of the U trough, as shown most clearly in Fig. 7.

The slots 59, 62 and 63 are covered by an inverted U-shaped plate 64 which is formed from relatively thin sheet metal. The cover plate 64 fits tightly over the top edge of side wall 54 for the full length of the latter and extends downward a greater distance on the inside than on the outside of the side wall. The slots 59, 62 and 63 are relatively shallow, so that flow of liquid through the passages, formed by the slots and cover plate 64, is effected by capillary siphon action. The distance that the longer side of cover plate 64 extends into the U trough determines the height to which the liquid level must rise in the trough before siphoning first starts by capillary action. That is, with a given height of the longer side wall of cover plate 64, the liquid must rise to a definite level in the U trough for liquid in slots 63 to rise by capillary action to the top edge of side wall 54; and, when the liquid level in the U trough reaches this definite level to effect such rise of liquid in slot 63 by capillary action to the level of cross slots 62, siphoning of liquid from the U trough takes place.

After siphoning action has once been started, siphoning of liquid continues as long as the liquid level in the U trough is at or above the bottom edge of the longer side wall of cover plate 64. If the siphon action is broken, the liquid in the U trough must again rise to the definite level sufficient to cause capillary rise of liquid in slots 63 to the height of the cross slots 62.

The liquid siphoned from the U trough flows down the outer slots 59 with a downwardly flowing film of liquid being formed at the outer surface of side wall 54. By notching the bottom edge of side wall 54 to form teeth 61, the liquid at the outer surface of side wall 54 is caused to flow toward a number of spaced points at which drops of liquid are formed.

The drops of liquid formed at the teeth 61 fall therefrom in rapid succession into compartments a, b and c in vessel 55, and the liquid flows from these compartments through the three uppermost tubes 47. The tubes 47 are connected at their ends to provide three separate paths of flow for the liquid divided by the liquid distributor 53. Referring more particularly to Fig. 3, the two left-hand banks of tubes 47 form a first path of flow for liquid, the next two banks of tubes 47 form a second path of flow for liquid, and the extreme right-hand bank of tubes forms a third path of flow for liquid. In the two paths of flow formed by the double banks of tubes, liquid first flows through a tube 47 in one bank and then through the next lower tube in the other bank. This is accomplished by providing open top buckets 65 at the ends of the tubes 47. The buckets 65 are formed with openings in the lower parts thereof to receive an end of a tube 47, the buckets being secured to the tubes about the openings. The buckets 65 are also notched to receive an end of the next higher tube 47 in the other bank of tubes. As shown most clearly in Fig. 5, the buckets 65 are spaced from the metal sheets 50 with the ends of the tubes 47 passing inside the buckets.

In the paths of flow formed by the single bank of tubes 47 open top buckets 66 are provided in the headers 49. The buckets 66 are formed with openings to receive an end of a tube 47 with the buckets being secured to the tubes about the openings. The buckets 66 are also spaced from the metal sheets 50 and each bucket receives liquid dripping from the end of the tube 47 immediately above it.

Within the tubes 47 are provided screens 67, as shown most clearly in Fig. 9. Each screen 67 is formed from a strip having opposite inclined portions 68. The inclined portions bear against the inclined sides of a strip of wood 69 extending lengthwise within each of the tubes 47.

Above one of the headers 49 is located a cylindrical vessel 70 which serves as a flash chamber to take care of vapor flashing of liquid being supplied to evaporator 12 from U-tube 27. As shown in Figs. 3 and 5, the up-leg of U-tube 27 passes through an opening in vessel 70 and is bent so that liquid is discharged against an end wall of the chamber. Liquid overflows from vessel 70 through a vertical tube 71 which extends into the U trough formed by member 53. The lower end of tube 71 is below the bottom edge of the longer side of cover plate 64, so that the liquid level in the U trough will always be above the lower end of tube 71 to prevent flow of vapor therethrough.

The vessel 70 is provided with a baffle 72 at one side of which is the discharge end of U-tube 27 and vertical tube 71 and at the opposite side of which is a vertical pipe 73 that extends into the upper part of vessel 70 and is connected at its lower end to header 49.

During operation of the refrigeration system, water vapor expelled from solution in generator 10 is condensed in condenser 11 and flows into U-tube 27. The condenser 11, U-tube 27, and vessel 70 are so located and positioned that, when the column of liquid is formed in the up-leg of U-tube 27, liquid will always overflow into vessel 70 from the liquid column for any pressure differential between evaporator 12 and condenser 11 ranging from zero to maximum. With liquid overflowing from the up-leg of U-tube 27 into vessel 70, it will be obvious that only the force of gravity is utilized to cause flow of liquid into evaporator 12 and that this force is small.

Vaporization of liquid may take place in U-tube 27 due to decrease of pressure on liquid rising in the up-leg of U-tube 27. For this reason the U-tube 27 is made sufficiently high to take care of vapor formed therein due to reduction of pressure on the rising liquid and the flashed vapor is directed against an end wall of cylindrical vessel 70. Vaporization of liquid or vapor flashing may also take place in vessel 70 due to pressure decrease on liquid therein. The liquid overflows through vertical tube 71 into U trough of member 53, and, since the lower end of tube 71 is immersed in liquid, a liquid trap is provided with the flashed vapor in vessel 70 having practically no effect in agitating liquid in the U trough. The flashed vapor passes through a more or less tortuous path about the lower edge of baffle 72 and then into the upper part of vessel 70 from which region the vapor flows quietly through pipe 73 into the upper part of header 49.

The vessel 70 is purposely inclined at an angle to the horizontal so that a relatively large liquid surface is formed to the level of the overflow tube 71. By maintaining a relatively large liquid surface in vessel 70, the latter is effectively utilized as a precooler for liquid flowing to evaporator 12. The heat of vaporization for vapor formed in vessel 70 is supplied by the sensible heat of the liquid, so that the temperature of the liquid is reduced with vapor flashing. By forming a large liquid surface, efficient precooling of liquid in vessel 70 is effected and the likelihood of superheating taking place in evaporator 12 is reduced. The baffle 72 is provided to separate any liquid spray from the vapor that passes through pipe 73. Any entrainment of liquid in the vapor flowing through pipe 73 would be a loss of such liquid.

The liquid entering the U trough of member 53 through vertical tube 71 is siphoned from the trough in the manner described above, whereby drops of liquid fall in rapid succession from the teeth 61 at the bottom edge of trough side wall 54.

The three paths of flow for liquid formed by the tubes 47 are indicated as A, B and C in Fig. 5, the liquid from compartments a, b and c supplying liquid to the three paths of flow A, B and C, respectively. No barriers or dams of any kind are provided in tubes 47 to maintain shallow pools of liquid therein. The tubes 47 are horizontally disposed and the liquid merely trickles along the bottom parts of the tubes with wetting of the screens 67 being effected by capillary action. Vaporization of water takes place in tubes 47 with consequent absorption of heat from the surroundings, as from a stream of air flowing over the exterior surfaces of the tubes and fins 48. The water vapor flows out of the tubes 47 and the open top brackets 65 and 66 into the headers 49, and the vapor then passes into absorber 14 in which it is absorbed by absorption solution.

By merely causing liquid to trickle in the tubes 47 a minimum quantity of liquid refrigerant is retained in evaporator 12 and at the same time the use of screens 67 insures a maximum area for vaporization of liquid surface. The spreading of liquid by the screens 67 within tubes 47 is desirable, because heat transfer is effected directly to liquid. The elimination of barriers or dams in tubes 47 is desirable in that no pools of liquid can form and liquid disturbances are reduced considerably. The liquid disturbances are referred to as superheating and result from the lack of water agitation, whereby the more or less stagnant water as it approaches vaporization temperature resists changing from liquid phase to vapor phase. At an evaporator temperature of 50° F. in the system described, the ratio of vapor volume to liquid volume is on the order of 100,000 to 1, so that a vapor bubble forming below the liquid surface level can cause a violent upward surge of liquid which is more pronounced the greater the distance of the vapor bubble below the liquid surface level. Due to the relatively large vapor volume and the aggravating effect of superheating, the formation of vapor bubbles can be so rapid that refrigerant is blown from the tubes and lost so far as any further refrigerating effect is concerned. As pointed out above, effective precooling of liquid in vessel 70 tends to reduce the phenomenon of superheating in evaporator tubes 47. By keeping the liquid level at a minimum height and employing screens 67 in the tubes, a thin film of liquid refrigerant is formed on the screens and vaporization is obtained from this film without boiling or vapor bubble formation below the liquid surface level. The screens 67 also serve as a catching film surface for liquid spray.

Water flows from each tube 47 to the next lower tube in its path of flow. Any water discharged from the lowermost tubes 47 in the three paths of flow A, B, and C passes directly into absorber 14. Absorber 14 is of the "film type" in which no body of absorption solution is maintained but in which the solution is caused to flow over the exterior surfaces of piping and drip from one section to a next lower section. Hence, a minimum quantity of liquid is maintained in both evaporator 12 and absorber 14, so that the quantity of liquid in the generator-absorber liquid circuit always will be substantially the same. Under these conditions, there will be no appreciable change in liquid level in vessel 38, whereby a substantially constant reaction head is provided for raising liquid in riser tubes 18 by vapor-lift action.

In a system of the type described, and particularly when a water solution of lithium chloride is employed, a high concentration of absorption solution must be used which is close to the solidifying point. For this reason it is desirable that variations in the quantity of liquid circulating in the absorption liquid circuit be kept at a minimum and hence evaporator 12 is advantageously employed because it retains a minimum quantity of liquid while providing maximum heat transfer surface.

The evaporator structure just described is particularly advantageous in a low pressure refrigeration system of the type disclosed. While the liquid refrigerant must be distributed by gravity over the inside surfaces of tubes 47, at the same time the construction provided is such that the escape of vapor from the tubes takes place with extremely low pressure loss. For example, in a refrigeration system generally like that described and having an ice melting capacity of five tons, with the system operating at full load and the evaporator at a temperature of 50° F., the vapor pressure in the evaporator is approximately 9.25 mm. Hg and the vapor pressure in the absorber is approximately 0.1 mm. Hg lower. Under these conditions the vapor pressure in generator 10 and condenser 11 is approximately 56 mm. Hg. It will be evident that under the particular operating conditions cited, the pressure drop of the escaping vapor, which passes from the evaporator to the absorber at an average velocity of about 130 feet per second, is extremely low and approximately 0.1 mm. Hg. It is of particular significance, therefore, that in the evaporator provided, flow of vapor therefrom is effected with extremely low pressure loss.

The evaporator tubes 47 are substantially horizontal and the liquid refrigerant passes along the inside of the tubes and at the bottoms thereof, as pointed out above. The screens 67 serve to provide capillary passages for the liquid and extend upward from the bottoms of the tubes. In the refrigeration system described, with the evaporator being maintained at a relatively low pressure, the refrigerant changes from liquid to gas phase by vaporization which is in the nature of boiling as contrasted with the manner in which evaporation of liquid takes place solely by surface phenomenon, such as, for example, the surface evaporation of alcohol in a person's hand. Vaporization by boiling takes place throughout the mass of liquid and differs in this important respect from the phenomenon of surface evaporation. While the screens 67 are provided to form a film of liquid refrigerant, and it has been pointed out above that the formation of the liquid film avoids boiling and forming of vapor bubbles, nevertheless the vaporization of liquid at or from the liquid film is still in the nature of boiling with the liquid film being formed so that the objections resulting from violent boiling and formation of vapor bubbles below the surface level of liquid pools is avoided.

In Fig. 6, it will be noted that the teeth 61 from which drops of liquid fall into vessel 55 are divided into three groups with the greatest number of teeth in the group located in compartment a, a fewer number of teeth in the group located in compartment b, and the least number of teeth in the group located in compartment c. The rate at which drops of liquid fall from each tooth is substantially the same, so that the sub-division of the liquid is directly proportional to the number of teeth located in each compartment. The liquid in compartments a, b and c flow therefrom into the paths of flow A, B and C, respectively, the quantity of liquid flowing into path of flow A being the greatest and into path of flow C being the smallest.

Referring to Fig. 5, the arrows indicate the direction in which air flows over the surfaces of the tubes 47 and heat transfer fins 48 of evaporator 12. The stream of air first flows over the banks of tubes forming the path of flow A, then over the banks of tubes forming the path of flow B, and then finally over the single bank of tubes forming the path of flow C. The air is warmest when it comes in thermal contact with the tubes forming the path of flow A, and, after cooling of air is effected by the first two banks of tubes, air at a lower temperature comes in thermal contact with the banks of tubes forming the path of flow B. After further cooling of air by the third and fourth banks of tubes, the air then comes in thermal contact with the last or final bank of tubes forming the path of flow C.

Since the greatest amount of water is supplied to path of flow A it will be clear that the greatest proportion of liquid is supplied to the part of evaporator 12 contacted by the warmest air. The proportion of liquid supplied to the path of flow B is less than that supplied to path of flow A, but at the same time the air is at a lower temperature when it comes in contact with the banks of tubes forming path of flow B. The proportion of liquid supplied to path of flow C is the smallest, the air being at a still lower temperature when it contacts the last or final bank of tubes 47.

In the arrangement provided a differential feed of liquid is effected into the compartments a, b and c, whereby the quantity of liquid supplied to each of the three paths of flow A, B and C is proportional to heat absorption, with the greatest quantity of liquid being supplied to the warmest air. In this manner liquid refrigerant supplied to evaporator 12 is utilized most effectively to produce cooling of an air stream flowing in thermal exchange relation with the tubes 47 and heat transfer fins 48 secured thereto. By dividing the liquid into several paths of flow through the evaporator tubes in the manner described, a further advantage is obtained in that there is less storing of water in the evaporator.

While a single embodiment of the invention has been shown and described, it will be apparent that modifications and changes may be made without departing from the spirit and scope of the invention, as pointed out in the following claims.

What is claimed is:

1. In an absorption refrigeration system having an evaporator, an absorber, a condenser, and a vapor generating and liquid lifting system and connections between the aforementioned parts to provide circuits for circulation of refrigerant and absorption solution, said evaporator, absorber and condenser being formed to hold liquid in small quantity whereby the quantity of solution circulating in the absorption liquid circuit is substantially constant with the concentration thereof being maintained within narrow limits, said evaporator including spaced apart headers and horizontally extending tubes connected thereto, said tubes being formed and arranged to provide paths of flow for liquid between said headers in all regions of which the depth of liquid is at a minimum and just sufficient to permit liquid to flow by gravity past successive regions in the paths of flow, structure within said headers formed and arranged so that liquid can freely pass by gravity from the lowest part of a tube into an end of another tube at a lower level, whereby liquid trickles through said tubes without the formation of single pools extending for any considerable distance lengthwise of the tubes, and means to cause liquid flowing through said tubes to spread over a substantial area to form a liquid film at the inner surfaces of said tubes so that practically all of the heat transfer is effected from the exterior of said tubes through the latter directly to said liquid film to cause substantially all vaporization of liquid to take place from said film without ebullition of liquid and without the formation of vapor bubbles below a liquid surface level.

2. In an absorption refrigeration system as set forth in claim 1 in which said means to form said liquid films within said tubes comprises internal screening to cause spreading of liquid by capillary action.

3. In an absorption refrigeration system including a condenser and an absorber and in which ebullition of liquid refrigerant tends to occur with vaporization of such liquid in producing a refrigerating effect; an evaporator connected to receive liquid refrigerant from the condenser and from which refrigerant vapor passes to the absorber, said evaporator comprising tubing having an inlet and an outlet and through which is arranged to flow liquid refrigerant received from the condenser; said tubing providing a path of flow for liquid in all regions of which the depth of liquid is at minimum and just sufficient to permit liquid to flow past successive regions in the path of flow; means to cause liquid flowing through said tubing to spread over a substantial area to form a liquid film at the inner surface of the tubing so that practically all of the heat transfer is effected from the exterior of the tubing through the latter directly to said liquid film to cause substantially all vaporization of liquid to take place from said film without ebullition of liquid and without the formation of vapor bubbles below a liquid surface level; and said tubing having a plurality of openings intermediate the inlet and outlet through which refrigerant vapor formed within said tubing can pass to the absorber while liquid refrigerant flows serially through successive regions in said path of liquid flow.

4. In an absorption refrigeration system including a condenser and an absorber and in which ebullition of liquid refrigerant tends to occur with vaporization of such liquid in producing a refrigerating effect; an evaporator connected to receive liquid refrigerant from the condenser and from which refrigerant vapor passes to the absorber, said evaporator comprising structure forming a chamber and tubing having an inlet at one level and an outlet at a lower level and through which is arranged to flow liquid refrigerant received from the condenser; said tubing having horizontally extending portions disposed outside said chamber and portions disposed within said chamber, said tubing being arranged to provide a path of flow for liquid in all regions of which the depth of liquid is at a minimum and just sufficient to permit liquid to flow past successive regions in the path of flow; means to cause liquid flowing along the bottom part of said tubing to spread over a substantial area to form a liquid film at the inner surface of said tubing, so that practically all of the heat transfer is effected from the exterior of the tubing through the latter directly to said liquid film to cause substantially all vaporization of liquid to take place from said film without ebullition of liquid and without the formation of vapor bubbles below a liquid surface level; and said tubing having openings at said portions disposed within said chamber through which refrigerant vapor formed in said horizontally extending portions can escape into said chamber at a plurality of places intermediate the inlet and outlet of said tubing and then pass to the absorber, while liquid refrigerant flows serially through successive regions in said path of liquid flow.

5. In an absorption refrigeration system including a condenser and an absorber and in which ebullition of liquid refrigerant tends to occur with vaporization of such liquid in producing a refrigerating effect; an evaporator connected to receive liquid refrigerant from the condenser and from which refrigerant vapor passes to the absorber, said evaporator comprising structure forming a plurality of chambers and tubing having an inlet at one level and an outlet at a lower level and through which is arranged to flow liquid refrigerant received from the condenser; said tubing having portions disposed within said chambers and horizontally extending portions connecting said chambers, said tubing being arranged to provide a path of flow for liquid refrigerant in all regions of which the depth of liquid is at a minimum and just sufficient to permit liquid to flow past successive regions in the path of flow; means to cause liquid flowing along the bottom part of said tubing to spread over a substantial area to form a liquid film at the inner surface of said tubing, so that practically all of the heat transfer is effected from the exterior of the tubing through the latter directly to said liquid film to cause substantially all vaporization of liquid to take place from said film without ebullition of liquid and without the formation of vapor bubbles below a liquid surface level; and said tubing having openings at said portions disposed within said chambers through which refrigerant vapor formed in said horizontally extending portions can escape from each end into said chambers at a plurality of places intermediate the inlet and outlet of said tubing and then pass from said chambers to the absorber, while liquid refrigerant flows serially through successive regions in said path of liquid flow.

6. In an absorption refrigeration system, an evaporator including spaced apart headers; horizontally extending tubes passing through openings in the headers and secured thereto; a liquid distributor supported within one of said headers, said distributor being arranged to receive liquid refrigerant and distribute the liquid to said tubes; structure within said headers for directing liquid from one of said tubes to a successively lower tube, such structure having openings permitting escape of refrigerant vapor into said headers from said tubes; said tubes providing paths of flow for liquid characterized by the absence of transverse barriers so that the formation of pools of liquid is avoided, whereby the depth of liquid in all regions of said tubes is at a minimum and just sufficient to permit liquid to flow past successive regions in said paths of flow; and means to cause spreading of liquid from the bottom parts of said tubes over a substantial area therein to produce a liquid film at the inner surfaces of said tubes.

7. In an absorption refrigeration system; an evaporator including spaced apart headers; a plurality of tubes passing through openings in said headers and secured thereto; open top buckets in said headers connected to the ends of some of said tubes and arranged to receive liquid dripping from the end of a tube at a higher level; means to supply liquid refrigerant to the uppermost tubes; said tubes and buckets providing paths of flow for liquid characterized by the absence of transverse barriers so that the formation of pools of liquid is avoided, whereby the depth of liquid in all regions of said tubes is at a minimum and just sufficient to permit liquid to flow past successive regions in said paths of flow; and means to cause liquid flowing through said tubes to spread over a substantial area therein to form a liquid film at the inner surfaces of said tubes.

8. In a refrigeration system; an evaporator having a plurality of paths of flow for liquid refrigerant; means to subdivide liquid refrigerant into said paths of flow including a substantially horizontal liquid holder; a vertically extending wall associated with said liquid holder, said vertically extending wall being provided with independent horizontal drip surfaces; a plurality of compartments below said drip surfaces each associated with one of said paths of flow; and means to siphon liquid from said holder onto said vertically extending wall so that drops of liquid fall by gravity from said horizontal drip surfaces into said compartments.

9. In a refrigeration system; an evaporator having a plurality of paths of flow for liquid refrigerant; means to supply liquid to said paths of flow including a substantially horizontal liquid holder; a vertically extending wall associated with said liquid holder, said vertically extending wall being provided with independent horizontal drip surfaces; said drip surfaces being divided into groups with each group being associated with one of said paths of flow; and means to siphon liquid from said holder onto said vertically extending wall so that drops of liquid fall by gravity from said horizontal drip surfaces.

10. In a refrigeration system; an evaporator having a plurality of paths of flow for liquid refrigerant; means to subdivide liquid into said paths of flow including a substantially horizontal liquid holder; a vertically extending wall associated with said liquid holder, a portion of said vertically extending wall being associated with each of said paths of flow; and means to form a plurality of siphon passages on said vertically extending wall to cause liquid to siphon from the inside of said holder and flow downwardly at the outside of said vertically extending wall, whereby drops of liquid fall by gravity from the bottom edge of said vertically extending wall for flow through said paths of flow; said vertically extending wall being associated with said paths of flow in such a manner that the quantity of liquid flowing to one of said paths of flow is greater than that flowing to another of said paths of flow.

11. An absorption refrigeration system employing only refrigerant and absorption liquid as the active fluid components and comprising a generator, a condenser, an evaporator and an absorber interconnected for flow of refrigerant and absorption liquid; the system being operable at a partial vacuum with the refrigerant vapor formed in said evaporator passing therefrom at a high velocity; the system being of the kind in which ebullition of liquid refrigerant tends to occur with vaporization of such liquid in the evaporator in producing a refrigerating effect; said evaporator comprising piping having an inlet at one level and an outlet at a lower level and into which liquid refrigerant is introduced at the inlet, said piping providing a path of flow for liquid in all regions of which the depth of liquid is at a minimum and just sufficient to permit liquid to flow past successive regions in the path of flow; and means to cause liquid flowing through said piping to spread over a substantial area to form a liquid film at the inner surface of the piping, so that practically all of the heat transfer is effected from the exterior of the piping through the latter directly to said liquid film to cause substantially all vaporization of liquid to take place from said film without ebullition and violent boiling of liquid and without the formation of vapor bubbles below a liquid surface level.

12. An absorption refrigeration system employing only refrigerant and absorption liquid as the active fluid components and comprising a generator, a condenser, an evaporator and an absorber interconnected for flow of refrigerant and absorption liquid; the system being operable at a partial vacuum with the refrigerant vapor formed in said evaporator passing therefrom to said absorber at a high velocity; the system being of the kind in which ebullition of liquid refrigerant tends to occur with vaporization of such liquid in said evaporator in producing a refrigerating effect; said evaporator comprising piping having an inlet at one level and an outlet at a lower level and into which liquid refrigerant is introduced from the condenser, said piping including horizontally disposed portions and providing a path of flow for liquid in all regions of which the depth of liquid is at a minimum and just sufficient to permit liquid to flow past successive regions in the path of flow; and means to cause liquid flowing along the bottom part of said piping to spread over a substantial area to form a liquid film at the inner surface of the piping, so that practically all of the heat transfer is effected from the exterior of the piping through the latter directly to said liquid film to cause substantially all vaporization of liquid to take place from said film without ebullition and violent boiling of liquid and without the formation of vapor bubbles below a liquid surface level.

13. A multi-pressure absorption refrigeration system employing water as the refrigerant and a salt solution as absorbent, such refrigerant and absorbent being the only active fluid components in the system; the system including an evaporator, an absorber, a condenser, a generator, and connections between the aforementioned parts to provide paths of flow for refrigerant and absorption liquid; the system being operable at a partial vacuum with the refrigerant vapor formed in said evaporator passing therefrom to said absorber at a high velocity; the system being of the kind in which ebullition of liquid refrigerant tends to occur with vaporization of such liquid in said evaporator in producing a refrigerating effect; said evaporator, absorber and condenser being formed to hold liquid in small quantity so that the quantity of absorbent circulating in the absorption liquid circuit is substantially constant with the concentration thereof being maintained within narrow limits; structure providing said evaporator including tubing having an inlet at one level and an outlet at a lower level and into which liquid refrigerant is introduced from said condenser, said tubing including horizontally disposed portions and providing a path of flow for liquid in all regions of which the depth of liquid is at a minimum and just sufficient to permit liquid to flow past successive regions in the path of flow; and means to cause liquid flowing along the bottom part of said tubing to spread over a substantial area to form a liquid film at the inner surface of said tubing, so that practically all of the heat transfer is effected from the exterior of said tubing through the latter directly to said liquid film to cause substantially all vaporization of liquid to take place from said film without ebullition and violent boiling of liquid and without the formation of vapor bubbles below a liquid surface.

14. In an absorption refrigeration system employing only refrigerant and absorption liquid as the active fluid components and including a condenser and an absorber; the system being of the kind in which ebullition of liquid refrigerant tends to occur with vaporization of such liquid in producing a refrigerating effect; structure providing an evaporator connected to receive liquid refrigerant from the condenser and from which refrigerant vapor passes to the absorber; the system being operable at a partial vacuum with the refrigerant vapor formed in said evaporator passing therefrom to the absorber at a high velocity; said structure including tubing having an inlet at one level and an outlet at a lower level and into which liquid refrigerant is introduced from the condenser, said tubing providing a path of flow for liquid refrigerant in all regions of which the depth of liquid is at a minimum and just sufficient to permit liquid to flow past successive regions in the path of flow; and means to cause liquid flowing in said tubing to spread over a substantial area to form a liquid film at the inner surface of the tubing, so that practically all of the heat transfer is effected from the exterior of the tubing through the latter directly to said liquid film to cause substantially all vaporization of liquid to take place from said film without ebullition and violent boiling of liquid and without the formation of vapor bubbles below a liquid surface level; said structure being so constructed and arranged that refrigerant vapor passes from said tubing to the absorber with extremely low pressure loss.

15. In an air conditioning system having a duct providing a passage for an air stream, refrigeration apparatus including an evaporator disposed in said passage, said evaporator having a plurality of paths of flow for liquid refrigerant arranged so that the air stream to be cooled first passes in thermal contact with one of said paths of flow, and, after being cooled by thermal contact with said one path of flow, then passes in thermal contact with another of said paths of flow, said paths of flow for liquid refrigerant being of different length, and said evaporator being so constructed and arranged that said paths of flow for liquid refrigerant are individually disposed over substantially the entire cross-sectional area of said passage.

ALBERT R. THOMAS.